US008452469B2

(12) United States Patent
Otokawa

(10) Patent No.: US 8,452,469 B2
(45) Date of Patent: May 28, 2013

(54) CONTROL APPARATUS FOR HYBRID VEHICLE

(75) Inventor: Kayo Otokawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 190 days.

(21) Appl. No.: 12/811,490

(22) PCT Filed: Feb. 23, 2009

(86) PCT No.: PCT/IB2009/000332
§ 371 (c)(1),
(2), (4) Date: Jul. 1, 2010

(87) PCT Pub. No.: WO2009/109822
PCT Pub. Date: Sep. 11, 2009

(65) Prior Publication Data
US 2010/0286858 A1    Nov. 11, 2010

(30) Foreign Application Priority Data
Mar. 6, 2008    (JP) .................. 2008-055669

(51) Int. Cl.
*B60L 11/14* (2006.01)
*G06G 7/70* (2006.01)

(52) U.S. Cl.
CPC .. *B60L 11/14* (2013.01); *G06G 7/70* (2013.01)
USPC ............... 701/22; 701/99; 701/111; 701/112

(58) Field of Classification Search
USPC ............... 701/22, 36, 51, 52, 53, 54, 58, 60, 701/61, 62, 64, 67, 68, 69, 99, 111; 180/65.2, 180/65.25, 65.26, 65.265, 65.27, 65.275, 180/65.28, 305; 477/3, 4, 5; 903/902, 903, 903/914
See application file for complete search history.

(56) References Cited

U.S. PATENT DOCUMENTS 6,317,665 B1 * 11/2001 Tabata et al. .................... 701/22
6,434,453 B1 * 8/2002 Kuroda et al. .................. 701/22

(Continued)

FOREIGN PATENT DOCUMENTS

| CN | 1730331 A | 2/2006 |
|---|---|---|
| CN | 1819940 A | 8/2006 |

(Continued)

OTHER PUBLICATIONS

Extended International Search Report of the corresponding International Application No. PCT/IB2009/000332.

(Continued)

*Primary Examiner* — Thomas Black
*Assistant Examiner* — Dale W Hilgendorf
(74) *Attorney, Agent, or Firm* — Global IP Counselors, LLP

(57) ABSTRACT

A hybrid vehicle control apparatus is provided with an engine, an electric motor, a holding element, an automatic transmission, a range position detecting device and a controller. The holding element is arranged between the engine and the electric motor to selectively connect and disconnect the engine and the electric motor to and from each other. The automatic transmission is arranged between the electric motor and a drive wheel. The range position detecting device detects a range position of the automatic transmission selected by a driver. The controller executes a control operation serving to stop the engine while also executing a slip control serving to lower a torque transfer capacity of the holding element upon a determination that a request to stop the engine has occurred while the engine is operating, the holding element is engaged, and the automatic transmission is detected in a non-driving range.

8 Claims, 4 Drawing Sheets

U.S. PATENT DOCUMENTS

| | | | |
|---|---|---|---|
| 6,907,325 B1 * | 6/2005 | Syed et al. | 701/22 |
| 7,197,383 B2 * | 3/2007 | Tobler et al. | 701/22 |
| 7,217,221 B2 * | 5/2007 | Sah et al. | 477/3 |
| 7,328,763 B2 | 2/2008 | Gouda et al. | |
| 7,347,803 B2 * | 3/2008 | Kobayashi et al. | 477/5 |
| 7,617,896 B2 * | 11/2009 | Ogata | 180/65.7 |
| 8,002,059 B2 * | 8/2011 | Tanishima | 180/65.275 |
| 8,132,635 B2 | 3/2012 | Fujimoto et al. | |
| 2004/0055800 A1 * | 3/2004 | Katou et al. | 180/65.2 |
| 2006/0027413 A1 * | 2/2006 | Tabata et al. | 180/305 |
| 2006/0032684 A1 * | 2/2006 | Rayl | 180/65.2 |
| 2007/0221421 A1 * | 9/2007 | Tanishima | 180/65.2 |
| 2008/0058154 A1 * | 3/2008 | Ashizawa et al. | 477/5 |
| 2008/0071437 A1 * | 3/2008 | Hirata et al. | 701/22 |

FOREIGN PATENT DOCUMENTS

| | | |
|---|---|---|
| CN | 101041353 A | 9/2007 |
| CN | 101100188 A | 1/2008 |
| JP | H8-126115 A | 5/1996 |
| JP | 2000-120858 A | 4/2000 |
| JP | 2006-46541 A | 2/2006 |
| JP | 2007-253780 A | 10/2007 |

OTHER PUBLICATIONS

An English translation of the Chinese Office Action for corresponding Chinese Application No. 200980107778.X, issued on Aug. 31, 2012.

* cited by examiner

CONTROL APPARATUS FOR HYBRID VEHICLE

CROSS-REFERENCE TO RELATED APPLICATIONS

This U.S. National stage application claims priority to Japanese Patent Application No. 2008-055669, filed on Mar. 6, 2008. The entire disclosure of Japanese Patent Application No. 2008-055669 is hereby incorporated herein by reference.

BACKGROUND

1. Field of the Invention

The present invention generally relates to a hybrid vehicle control apparatus for a hybrid vehicle equipped with an engine and an electric motor as power sources. More specifically, the present invention relates to a hybrid vehicle control apparatus in which an occurrence of vibration and noise resulting from resonance can be suppressed when an engine of a hybrid vehicle is stopped while a holding element arranged between the engine and an electric motor of the hybrid vehicle is in an engaged state.

2. Background Information

One example of a conventional hybrid vehicle control apparatus for a hybrid vehicle is disclosed in Japanese Laid-Open Patent Publication No. 11-82261 (hereinafter referred to as "the conventional control apparatus"). In the conventional control apparatus, a holding element is arranged between the internal combustion engine and the electric motor, and serves to selectively connect and disconnect the engine and the motor to and from each other. A transmission is arranged between the electric motor and a drive wheel. As drive modes, the conventional control apparatus has an electric (EV) drive mode in which the vehicle uses only the electric motor as a power source and an engine drive mode in which the vehicle uses at least the internal combustion engine as a power source. The apparatus improves the fuel efficiency of the vehicle by switching between the two drive modes in accordance with a driving condition.

In the conventional control apparatus, when a request to stop the engine is issued (e.g., if a driver turns an ignition switch off) while the holding element is engaged and the engine is running, it is conceivable that the engine will be stopped with the holding element remaining in a fully engaged state instead of being stopped after the holding element has been temporarily released.

SUMMARY

It has been discovered that if the engine is stopped with the holding element fully engaged, then there is the possibility that resonance will occur in a power train including the engine when the rotational speed of the engine passes through a prescribed rotational speed region as it decreases to zero. Such resonance can cause the rotational speed of the engine to fluctuate greatly. A rotational speed region in which this kind of resonance occurs will hereinafter be cause a "resonance band." When the rotational speed of an engine passes through a resonance band and a fluctuation of the rotational speed of the engine occurs as mentioned above, the rotational speed fluctuation can drive a vibration that is transmitted to, for example, a transmission. This situation can cause noise to occur due to a chattering (vibrating contact) of gears inside the transmission. Such vibration and noise resulting from resonance can cause a driver to experience a feeling that something is odd about the vehicle.

The present invention was conceived in view of this problem. One object of the present invention is to provide a hybrid vehicle control apparatus for a hybrid vehicle having a holding element that is arranged between an internal combustion engine and an electric motor for connecting and disconnecting the internal engine and the electric motor to and from each other, in which the control apparatus suppresses an occurrence of vibrations and noise resulting from resonance when the internal combustion engine is stopped while the holding element in an engaged state.

In order to achieve the aforementioned object, a hybrid vehicle control apparatus is provided that basically comprises an engine, an electric motor, a holding element, an automatic transmission, a range position detecting device and a controller. The holding element is arranged between the engine and the electric motor to selectively connect and disconnect the engine and the electric motor to and from each other. The automatic transmission is arranged between the electric motor and a drive wheel. The range position detecting device is arranged to detect a range position of the automatic transmission selected by a driver. The controller is configured to execute a control operation serving to stop the engine while also executing a slip control serving to lower a torque transfer capacity of the holding element upon a determination that a request to stop the engine has occurred while the engine is operating, the holding element is engaged, and the range position detecting device detects the automatic transmission in a non-driving range.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents. Preferred embodiments of a hybrid vehicle control apparatus according to the present invention will now be explained with reference to the drawings.

Figure 1:
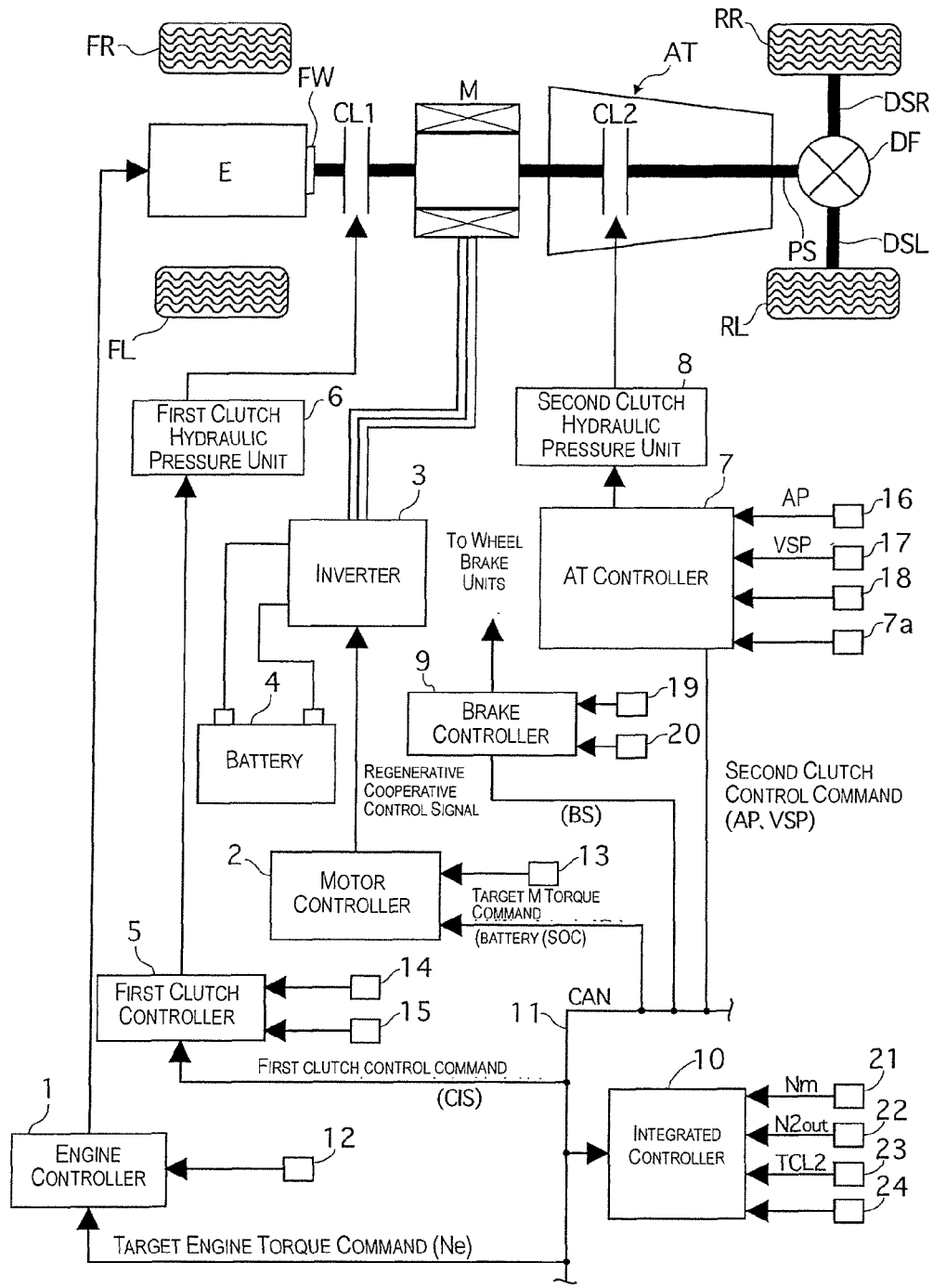
FIG. 1 is an overall schematic block diagram of a rear wheel drive hybrid vehicle equipped with a hybrid vehicle control apparatus in accordance with one illustrated embodiment.

Referring initially to FIG. 1, a drive train of a hybrid vehicle having a hybrid vehicle control apparatus in accordance with an illustrated embodiment of the present invention is explained. In this example, the hybrid vehicle is arranged as a rear wheel drive hybrid vehicle. FIG. 1 is an overall schematic block diagram showing a drive train control system of the hybrid vehicle. As shown in FIG. 1, the drive train of the hybrid vehicle in the illustrated embodiment includes an internal combustion engine E, a first clutch CL1 (first holding element), a motor M, a second clutch CL2 (second holding element), an automatic transmission AT, a propeller shaft PS, a differential DF, a left drive shaft DSL, a right drive shaft DSR, a left rear wheel RL (drive wheel) and a right rear wheel RR (drive wheel). The hybrid vehicle also includes a left front wheel FL and a right front wheel FR.

As shown in FIG. 1, the drive train control system of the hybrid vehicle includes an engine controller 1, a motor controller 2, an inverter 3, a battery 4, a first clutch controller 5, a first clutch hydraulic pressure unit 6, an AT (automatic transmission) controller 7, a second clutch hydraulic pressure unit 8, a brake controller 9 and an integrated controller 10. The engine controller 1, the motor controller 2, the first clutch controller 5, the AT controller 7, the brake controller 9, and the integrated controller 10 are connected to one another with a CAN communication line 11 such that they can communicate with one another.

Moreover, the hybrid vehicle is provided with an inhibitor switch 7a, an engine rotational speed sensor 12, a resolver 13, a first clutch hydraulic pressure sensor 14, a first clutch stroke sensor 15, an accelerator position switch 16, a vehicle speed sensor 17, a second clutch hydraulic pressure sensor 18, a wheel speed sensor 19, a brake stroke sensor 20, a motor rotational speed sensor 21, a second clutch output rotational speed sensor 22, a second clutch torque sensor 23, and an engine coolant temperature sensor 24.

The engine E is an internal combustion engine (e.g., a gasoline engine or a diesel engine). The opening degree of a throttle valve of the engine E and other aspects of the engine are preferably controlled based on control commands issued from the engine controller 1 as discussed in more detail below. A flywheel FW is provided on an output shaft of the engine E as shown in FIG. 1.

The first clutch CL1 is a holding element that is arranged between the engine E and the motor M. The first clutch CL1 is hydraulically controlled based a control command from the first clutch controller 5 as discussed in more detail below using hydraulic pressure produced by the first clutch hydraulic pressure unit 6. The first clutch CL1 is configured and arranged to be controlled to one of an engaged state, a disengaged state, and a slip engagement state (a partially engaged state in which slipping occurs). The first clutch CL1 is a dry single-plate clutch that is configured such that a clutch piston stroke and a torque transfer capacity (engagement torque capacity) thereof can be controlled in a continuously variable fashion by controlling a flow rate and pressure of a control oil. The first clutch CL1 is configured to be normally closed, i.e., such that it is fully engaged due to the force of a return spring when the flow rate and hydraulic pressure of the control oil are both zero.

The motor M is, for example, a conventional synchronous motor/generator having a rotor provided with embedded permanent magnets and a stator with a stator coil wound thereabout. The motor M is controlled by controlling a three-phase alternating current that is produced by the inverter 3 based on a control command issued from a motor controller 2 (described later) and applied to the motor M. The motor M is configured and arranged to operate as an electric motor by receiving electric power from the battery 4 and outputting a rotary drive force or torque (i.e., this operating state is called a power running mode). The motor M is also configured and arranged to operate as an electric generator that recharges the battery 4 when the rotor is rotated by an external force such that an electromotive force is produced at both ends of the stator coil (i.e., this operating state is called a regeneration mode). The rotor of the motor M is connected to an input shaft of the automatic transmission AT through a damper (not shown).

The second clutch CL2 is a holding element that is arranged between the motor M and the left and right rear wheels RL and RR. The second clutch CL2 is hydraulically controlled based a control command from the AT controller 7 as discussed in more detail below using hydraulic pressure produced by the second clutch hydraulic pressure unit 8. The second clutch CL2 is a wet multi-plate clutch configured such that it (i.e., the torque transfer capacity thereof) can be controlled in a continuously variable fashion by controlling the flow rate and pressure of a hydraulic oil with, for example, a proportional solenoid. The second clutch CL2 is configured and arranged to be controlled to one of an engaged state, a disengaged state, and a slip engagement state.

The automatic transmission AT is, for example, a conventional step-shifting type automatic transmission having five forward speeds (gear ratios) and one reverse speed (gear ratio). The automatic transmission AT is configured and arranged to shift automatically change the gear ratio based on such factors as the vehicle speed, the throttle opening, the accelerator position, or the like. In the illustrated embodiment, the second clutch CL2 is not arranged as a single dedicated clutch that has been separately added to the automatic transmission AT. Rather, the second clutch CL2 is foimed by one or more of frictional holding elements that make up a plurality of frictional engaging elements that are engaged and disengaged as required in order to achieve the different speeds (gear ratios) of the automatic transmission AT.

The output shaft of the automatic transmission AT is connected to the left and right rear wheels RL and RR through the propeller shaft PS, the differential DF, the left drive shaft DSL, and the right drive shaft DSR. In the illustrated embodiment, as mentioned above, the first and second clutches CL1 and CL2 include, for example, conventional multi-plate wet clutches for which the flow rate and pressure of the hydraulic fluid can be controlled with proportional solenoids.

In this embodiment, the hybrid drive train has three drive modes (first, second, and third drive modes) that are set in accordance with the engagement state (engaged or released) of the first clutch CL1. The first drive mode is an electric vehicle drive mode (hereinafter called "EV mode") in which the first clutch CL1 is released and the vehicle is driven using only power from the motor M as a power source. The second drive mode is a hybrid drive mode (hereinafter called "HEV mode") in which the first clutch CL1 is engaged and the vehicle is driven using the engine E as a power source in addition to the motor M. When the drive train transitions from the EV mode to the HEV mode, the first clutch CL1 is engaged and torque from the motor M is used to start the engine E. The third drive mode is an engine-included slip drive mode (hereinafter called "WSC (wet start clutch) mode") in which the first clutch CL1 is engaged, the second clutch CL2 is controlled to a slipping state, and the vehicle is driven using the engine E as a power source in addition to the motor M. This mode can serve to achieve a creep drive state, particularly when the battery SOC is low or when the engine coolant temperature is low. When the WSC mode is selected while the vehicle is stopped (VSP=0) and a request for generating electricity is issued based on the battery SOC, power from the engine E is used to operate the motor M as an electric generator.

The HEV mode described above also includes three other drive modes, namely an engine drive mode, a motor assist drive mode, and a driving electric power generation mode.

The engine drive mode is a mode in which the drive wheels RR and RL are driven using only the engine E as a power source. The motor assist drive mode is a mode in which the drive wheels RR and RL are driven using both the engine E and the motor M as power sources. The driving electric power generation mode is a mode in which the drive wheels RR and RL are driven using the engine E as a power source and, simultaneously, the motor M is driven as an electric generator using the engine E as a power source. When the vehicle is traveling at a constant speed or accelerating, power from the engine E is used to operate the motor M as an electric generator. When the vehicle is decelerating, braking energy is used regeneratively to drive the motor M as a generator and recharge the battery 4.

The hybrid vehicle control system of the hybrid vehicle will now be explained. Basically, the hybrid vehicle control apparatus is configured to stop the engine E while executing a slip control of the first clutch CL1 (e.g., the holding element) when a request to stop the engine E occurs while the engine E is operating (running), the first clutch CL1 (e.g., the holding element) is engaged, and the transmission AT is in a non-driving range. With the stop engine control of the illustrated hybrid vehicle control apparatus, the occurrence of vibration and noise resulting from resonance can be suppressed when the engine E is stopped while the first clutch CL1 (e.g., the holding element) between the engine E and the electric motor is engaged.

Basically, the engine controller 1 receives engine rotational speed information from the engine rotational speed sensor 12. Based on a target engine torque command from the integrated controller 10, the engine controller 1 issues a command to control an engine operating point (engine rotational speed Ne and engine output torque Te) to, for example, a throttle valve actuator (not shown). The engine controller 1 also feeds information regarding the engine rotational speed Ne to the integrated controller 11 through the CAN communication line 11.

The motor controller 2 receives information from the resolver 13 serving to detect a rotational position of the rotor of the motor M. Based on a target motor torque command from the integrated controller 10, the motor controller 2 issues a command to control an operating point of the motor M (motor rotational speed Nm and motor output torque Tin) to the inverter 3. The motor controller 2 also monitors the battery SOC (state of charge) of the battery 4. In addition to using the battery SOC information as control information for the motor M, the motor controller 2 feeds the battery SOC information to the integrated controller 10 through the CAN communication line 11.

The first clutch controller 5 receives sensor information from the first clutch hydraulic pressure sensor 14 and the first clutch stroke sensor 15. Based on a first clutch control command from the integrated controller 10, the first clutch controller 5 issues a command to control connection and release of the first clutch CL1 to the first clutch hydraulic unit 6. The first clutch controller 5 also feeds information regarding a stroke C1S of the first clutch to the integrated controller 11 through the CAN communication line 11.

The AT controller 7 receives sensor information from the accelerator position sensor 16, the vehicle speed sensor 17, the second clutch hydraulic pressure sensor 18, and the inhibitor switch 7a (AT range position sensor) that issues a signal (AT range position signal) indicating the position of a selector lever operated by a driver. Based on a second clutch control command from the integrated controller 10, the AT controller 7 issues a command to control connection and release of the second clutch CL2 to the second clutch hydraulic unit 8, which is inside an automatic transmission hydraulic pressure control valve. The AT controller 7 also feeds the sensor information indicating the accelerator position AP, the vehicle speed VSP, and the status of the inhibitor switch 7a to the integrated controller 10 through the CAN communication line 11.

The brake controller 9 receives sensor information from the wheel speed sensor 19 that detects a wheel speed off each of the four wheels and from a brake stroke sensor 20. For example, if a brake pedal is depressed and a requested braking force determined based on a brake stroke BS cannot be achieved with a regenerative braking force alone, then the brake controller 9 executes a regenerative cooperative brake control based on a regenerative cooperative brake control command from the integrated controller 10 so as to supplement the regenerative braking force with a mechanical braking force (i.e., a braking force produced by a frictional brake).

The integrated controller 10 serves the functions of managing the energy consumption of the vehicle as a whole and running the vehicle at the highest possible efficiency. The integrated controller 10 receives information from the motor rotational speed sensor 21, the clutch output rotational speed sensor 22, the second clutch torque sensor 23 and the engine coolant temperature sensor 24. The motor rotational speed sensor 21 detects the motor rotational speed Nm. The clutch output rotational speed sensor 22 detects an output rotational speed N2out of the second clutch CL2. The second clutch torque sensor 23 detects a torque transfer capacity TCL2 of the second clutch CL2. The engine coolant temperature sensor 24 detects an engine coolant temperature. The integrated controller also receives information through the CAN communication line 11.

The integrated controller 10 executes an operation control of the engine E by sending a control command to the engine controller 1. The integrated controller 10 also executes an operation control of the motor M by sending a control command to the motor controller 2. The integrated controller 10 further executes engagement and release control of the first clutch CL1 by sending a control command to the first clutch controller 5, and executes engagement and release control of the second clutch CL2 by sending a control command to the AT controller 7.

The integrated controller 10 preferably includes a microcomputer with a seizure compensation control program that controls the engine E, the motor M, the first clutch CL1, the second clutch CL2 and other various components of the hybrid vehicle as discussed below. The integrated controller 10 can also include other conventional components such as an input interface circuit, an output interface circuit, and storage devices such as a ROM (Read Only Memory) device and a RAM (Random Access Memory) device. The microcomputer of the integrated controller 10 is programmed to control the engine E, the motor M, the first clutch CL1, the second clutch CL2 and other various components. The integrated controller 10 is operatively coupled to the engine controller 1, the motor controller 2, the first clutch controller 5, the AT controller 7 in a conventional manner. The internal RAM of the integrated controller 10 stores statuses of operational flags and various control data. The internal ROM of the integrated controller 10 stores various data for various operations. The integrated controller 10 is capable of selectively controlling any of the components of the control system in accordance with the control program. It will be apparent to those skilled in the art from this disclosure that the precise structure and algorithms for the integrated controller 10 can be any combination of hardware and software that will carry out the functions discussed herein.

Figure 2:
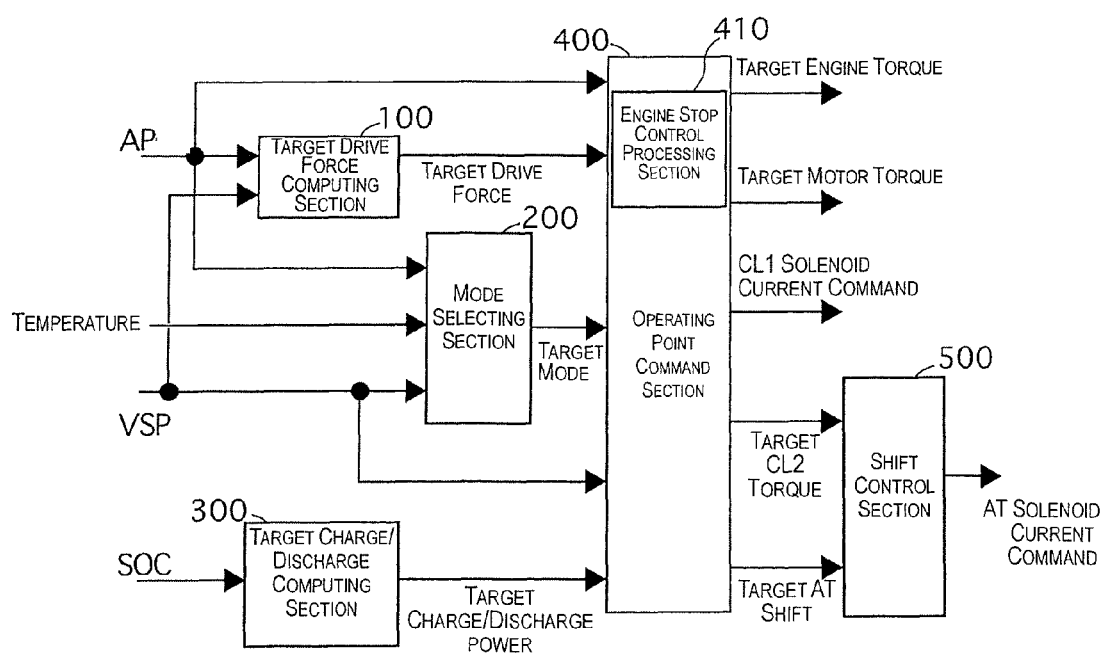
FIG. 2 is a control block diagram illustrating the computer programming executed by an integrated controller of the hybrid vehicle control apparatus of the illustrated embodiment.

The controls executed by the integrated controller 10 in the illustrated embodiment will now be explained with reference to the block diagram shown in FIG. 2. The computational processing of this control is executed by the integrated controller once per prescribed control cycle period, e.g., 10 msec. The integrated controller 10 has a target drive force computing section 100, a mode selecting section 200, a target charge/discharge computing section 300, an operating point command section 400, and a shift control section 500.

The target drive force computing section 100 is configured to use a prescribed target drive force map to compute a target drive force tFo0 based on the accelerator position AP and the vehicle speed VSP.

The mode selecting section 200 is configured to compute a target mode using a prescribe mode map. The mode map includes an EV mode, a WSC mode, and an HEV mode, and the target mode is computed based on the accelerator position AP and the vehicle speed VSP. The EV mode is selected when the accelerator position AP is small and the vehicle speed VSP is equal to or below a prescribed value. However, the HEV mode or the WSC mode is automatically set as the target mode when the battery SOC becomes equal to or smaller than a prescribed value while the EV mode is selected. The WSC mode is set to a vehicle speed region that is lower than a lower limit vehicle speed VSP1 corresponding to a transmission output rotational speed that occurs when the engine E is idling while the automatic transmission AT is in first gear. Also, the mode selecting section 200 is configured to select the WSC mode when the vehicle is starting into motion if the EV mode cannot be achieved because the battery SOC is low or if stopping the engine cannot be permitted because the engine coolant temperature is low.

The target charge/discharge computing section 300 uses a prescribed target charge/discharge amount map to compute a target charge/discharge power tP based on the battery SOC.

The operating point command section 400 computes a transitional target engine output torque Te*, a target motor output torque Tm*, a target second clutch torque transfer capacity TCL2*, a target gear position of the automatic transmission AT, and a first clutch solenoid current command as an operating point target based on the accelerator position AP, the target drive force tFo0, the target mode, the vehicle speed VSP, and the target charge/discharge power tP.

The shift control section 500 is configured to control a solenoid valve inside the automatic transmission AT based on a shift schedule of a shift map so as to achieve the target second clutch torque transfer capacity TCL2* and the target gear position. The shift map is configured such that the target gear position is set in advance based on the vehicle speed VSP and the accelerator position AP.

The operating point command section is provided with an engine stop control processing section 410. The engine stop control processing section 410 executes an engine stop control by controlling the engine E, the motor M, and the first clutch CL1 as described below when a request to stop the engine occurs while the transmission AT is in a non-driving range (a range other than Drive (D), Reverse (R), and the like, e.g., Park (P) or Neutral (N)) and the engine is operating with the first clutch CL1 engaged.

Figure 3:
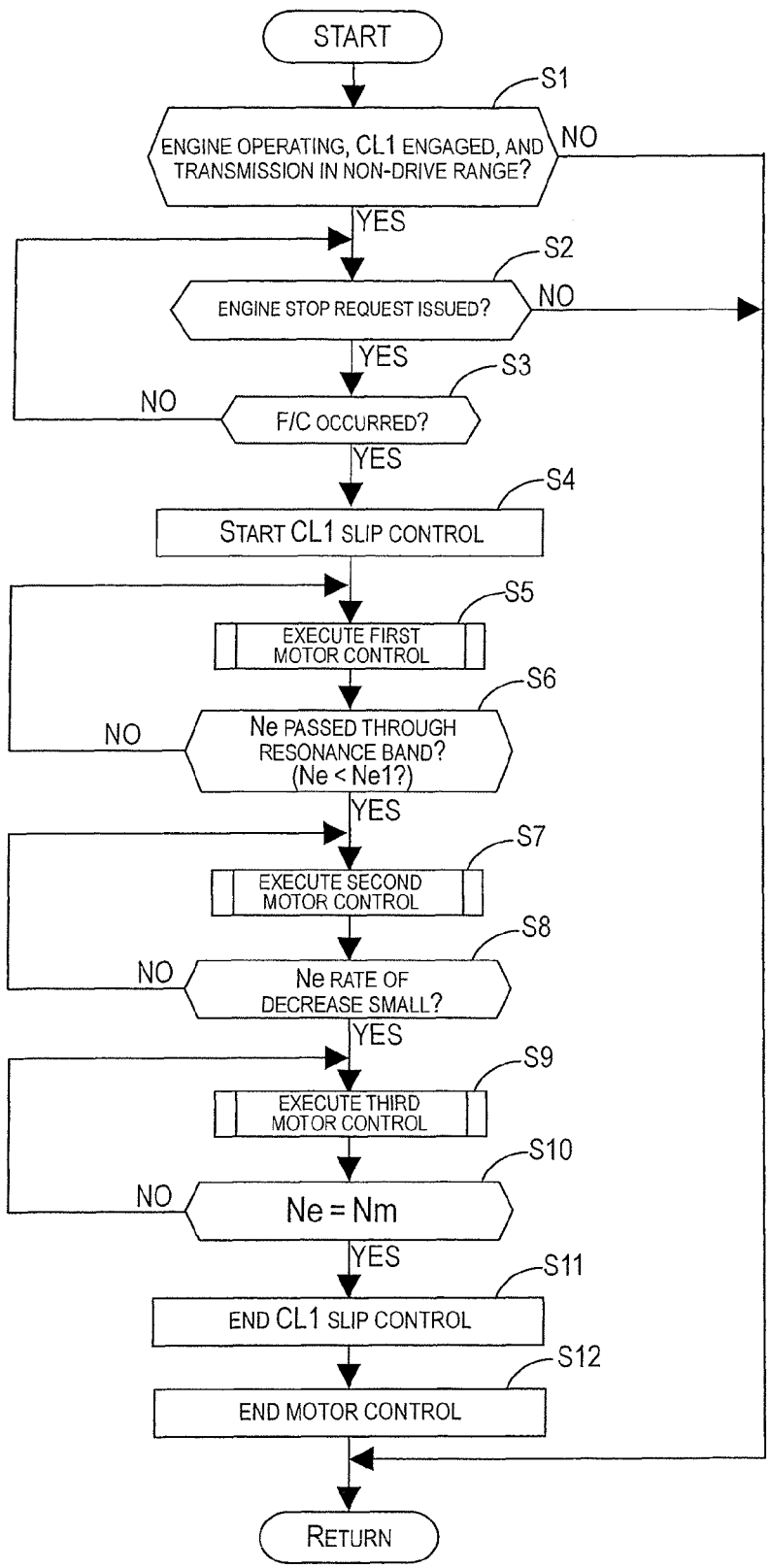
FIG. 3 is a flowchart of an engine stop control executed by the integrated controller of the hybrid vehicle control apparatus of the illustrated embodiment.

The engine stop control executed by the engine stop control processing section 410 will now be explained based on the flowchart shown in FIG. 3.

In step S1, the engine stop control processing section 410 determines if the engine E is operating (running), the first clutch CL1 is engaged, and the range position of the automatic transmission AT is a non-driving range. If all of these conditions are satisfied, then the processing section 410 proceeds to step S2. Otherwise, it ends the control loop.

In step S2, the processing section 410 determines if the operating point command section 400 has issued an engine stop request signal. If the engine stop request has been issued, then the processing section 410 proceeds to step S3. Otherwise, it ends the control loop.

One example of an engine stop request situation (e.g., the conditions of steps S1 and S2 are satisfied) is a situation in which a driver turns an ignition switch IGN-SW from "on" to "off" while the range position is Park (P), the HEV mode has been selected because the state of charge of the battery 4 is low, and the engine E is idling with the first clutch CL1 engaged.

In addition, another example of such an engine stop request situation will now be explained. Consider a situation in which a driver recognizes that the battery SOC is low (for example, by viewing an SOC indicator on an instrument panel) while the vehicle is stopped and the transmission is in the P range and the driver deliberately depresses an accelerator pedal to charge the battery 4. In response, the first clutch CL1 engages and the engine E starts, thereby causing the motor M to generate electricity. When the driver recognizes that the charging is complete, the driver ends the depression of the accelerator pedal by releasing his or her foot from the pedal. The accelerator pedal operation amount (accelerator position AP) and the vehicle speed VSP become zero and the conditions for changing to the EV mode are satisfied (because the battery SOC is sufficient). However, since the range position is the P range, an engine stop request is issued to stop the engine E and the motor M while the first clutch CL1 remains engaged.

In step S3, the processing section 410 checks if the engine controller 1 has issued a fuel cut F/C command to stop a fuel injection control (hereinafter called "fuel cutting F/C" control) of the engine E, and issued a stop ignition control command to stop an ignition control of the engine E. If the fuel cut F/C command has been sent, the processing section proceeds to step S4. Otherwise, it returns to step S2.

In step S4, the processing section 410 commences a slip control of the first clutch CL1, i.e., a control of the first clutch torque transfer capacity TCL1. Then, the processing section 410 proceeds to step S5. Thus, with the steps S2 to S4, after an engine stop request occurs and a fuel cut F/C command is issued, a slip control is then executed.

The control of the first clutch CL1 executed in this control loop involves first temporarily lowering a target first clutch torque transfer capacity TCL1* by a large amount from a first clutch torque transfer capacity maximum value TCL1max that is sufficient to achieve complete engagement to a prescribed value TCL1α (<TCL1max) and then raising the target first clutch torque transfer capacity TCL1* at a prescribed rate with a timer to a prescribed value TCL1β (TCL1α<TCL1β<TCL1max). Afterwards, the target first clutch torque transfer capacity TCL1* is held at the prescribed value TCL1β (TCL1*=TCL1β) until a slip control end command is issued (S11). The reason for initially lowering the target first clutch torque transfer capacity TCL1* by a large amount to the prescribed value TCL1α is to make it easier to lower the motor rotational speed Nm by a large amount. The rate and timer values are set in consideration of a control precision of the first clutch CL1. In other words, the rate and timer values are set to avoid setting a rate or time that would cause the first clutch CL1 to be controlled in increments that are too small for the first clutch CL1 to respond to in a predictable manner.

In step S5, the processing section 410 starts a first motor control of the motor M after confirming that the first clutch CL1 has actually started slipping based on a detection value of the first clutch oil pressure sensor 14. Then, the processing section 410 proceeds to step S6.

The first to third motor controls of the motor M shown in the flowchart constitute a feedback control of the motor rotational speed Nm and serve to set a target motor rotational speed Nm* and control the motor rotational speed Nm to the target rotational speed Nm*. In the first motor control executed in step S5, the target motor rotational speed Nm* is initially decreased rapidly in a stepping fashion and then decreased slowly in a ramp-like fashion. More specifically, the target motor rotational speed Nm* is first set to a rotational speed Ne3 that is much higher than an upper limit rotational speed Ne2 of a resonance band. Afterwards, the target motor rotational speed Nm* is lowered from the rotational speed N3 to a lower limit rotational speed Ne1 of the resonance band at a fixed decrease rate ΔNm* (negative value) of the engine rotational speed at a prescribed cycle period. The upper limit rotational speed Ne2 and the lower limit rotational speed Ne1 of the resonance band are calculated in advance based on specifications of the vehicle, experimentation, or the like.

In the illustrated embodiment, a goal of the control is to decrease the engine rotational speed Ne from an engine rotational speed Ne0' detected immediately before the fuel cut F/C control is executed to the lower limit rotational speed Ne1 of the resonance band at a prescribed decrease rate ΔNe (negative value) of the engine rotational speed. The size of the prescribed decrease rate ΔNe is set to a value that is larger than (a more rapid rate of decrease than) the rate of decrease that would occur if the engine E were allowed to come to a stop naturally with the first clutch CL1 in a fully released state after the fuel cut F/C. A time T0 required for the engine rotational speed Ne to decrease from the rotational speed Ne0' to the lower limit rotational speed Ne1 is calculated using the following equation: T0=(Ne1−Ne0')/ΔNe.

If the target motor rotational speed Nm* is decreased from the rotational speed Ne3 to the lower limit rotational speed Ne1 for the same amount of time T0 as the engine rotational speed Ne (the time required to decrease the target motor rotational speed Nm* from the rotational speed Ne0' to the rotational speed Ne3 being substantially zero), then the decrease rate ΔNm* is calculated with the following equation: ΔNm*=(Ne1−Ne3)/T0. The difference between the rotational speed Ne and the rotational speed Nm* is large when the first motor control starts, but it gradually decreases until the engine rotational speed Ne and the target motor rotational speed Nm* are substantially equal after the time T0 has elapsed. If we assume that the relationship Nm≈Nm*, then the relationship Nm<Ne holds consistently during the first motor control.

Since the first motor control controls the motor rotational speed Nm to a value lower than the engine rotational speed Ne, a torque acting in a direction of decreasing the engine rotational speed Ne develops in the first clutch CL1. The size of the torque is equal to the first clutch torque transfer capacity TCL1. In short, the engine rotational speed Ne decreases at the decrease rate ΔNe due to the torque of the first clutch torque transfer capacity TCL1. The prescribed value TCL1β used in step S4 is set to such a value that the engine rotational speed Ne will decrease at the decrease rate ΔNe.

In step S6, the processing section 410 determines if the engine rotational speed Ne has decreased to a rotational speed below the resonance band. More specifically, if the detected engine rotational speed Ne is below the lower limit rotational speed Ne1, then the processing section 410 determines that the engine rotational speed Ne has passed through the resonance band and proceeds to step S7. If the engine rotational speed Ne is equal to or above the lower limit rotational speed Ne1, then the processing section 410 determines that the engine rotational speed Ne has not passed through the resonance band and returns to step S5. The motor M is controlled such that the motor rotational speed Nm is lower than the engine rotational speed Ne until the engine rotational speed Ne passes through the resonance band.

In step S7, the processing section 410 switches from the first motor control to the second motor control of the motor M and proceeds to step S8. In the second motor control executed in step S7, the processing section 410 sets the target motor rotational speed Nm* to the lower limit rotational speed Ne1 and executes feedback control of the motor rotational speed Nm. In other words, after the engine rotational speed Ne has passed through the resonance band to a rotational speed below the resonance band, the motor M is controlled such that the motor rotational speed Nm is higher than the engine rotational speed Ne. Since any motor rotational speed is sufficient so long as it is higher than the engine rotational speed Ne, the target motor rotational speed Nm* can be set to any value other than the lower limit rotational speed Ne1 (so long as Nm*>Ne).

In step S8, the processing section 410 determines if the size of the rate of decrease of the detected engine rotational speed Ne is below a prescribed value. If the size of the rate is below the prescribed value, then the processing section 410 proceeds to step S9. If not, then the processing section 410 returns to step S7. Since the second motor control controls the motor rotational speed Nm to a value higher than the engine rotational speed Ne, a torque acting in a direction of raising the engine rotational speed Ne develops in the first clutch CL1. The size of the torque is equal to the first clutch torque transfer capacity TCL1. The torque TCL1 causes the size of the rate of decrease of the engine rotational speed Ne to be smaller than the decrease rate ΔNe and the engine rotational speed decreases more gradually. When the size of the rate of decrease of the engine rotational speed Ne becomes smaller than a prescribed value, the processing section determines that the rate of decrease is sufficiently slow and proceeds to step S9.

In step S9, the processing section 410 switches from the second motor control to the third motor control of the motor M and proceeds to step S10. The third motor control executed in step S9 sets the target motor rotational speed Nm* to the same value as a detected engine rotational speed Ne.

In step S10, the processing section 410 determines if a detected motor rotational speed Nm is the same as the engine rotational speed Ne. If so, then the processing section 410 proceeds to step S11. If not, then the processing section 410 returns to step S9. Step S10 can also be configured to determine if a difference between the detected rotational speeds Nm and Ne is smaller than a prescribed amount β. In such a case, the prescribed amount β is set to a value at which a frictional energy occurring when the first clutch CL1 is fully engaged (TCL1×difference β) is within an allowed range that is determined from the perspective of clutch wear.

In step S11, the processing section 410 ends the slip control of the first clutch CL1 and engages the first clutch CL1 fully. Then, the processing section 410 proceeds to step S12. More specifically, since the first clutch CL1 is normally closed (engaged), the first clutch torque transfer capacity TCL1 returns to the first clutch torque transfer capacity maximum value TCL1max (i.e., the fully engaged value) when the output of the control command to the first clutch CL1 is stopped. Also, if a normally-closed first clutch CL1 is used, then the target first clutch torque transfer capacity TCL1* is reset to the first clutch torque transfer capacity maximum value TCL1max in step S11 (for example, when the engine stops due to the accelerator being released while the vehicle is in the P range). In this way, the first clutch CL1 is engaged fully when the engine rotational speed Ne has passed through the resonance band and reached a rotational speed below the resonance band and the difference between the motor rotational speed Nm and the engine rotational speed Ne is equal to or smaller than a prescribed rotational speed (zero).

In step S12, the processing section 410 ends the third motor control after it has configured that the engine rotational speed Ne is zero. The processing section 410 then ends the control loop.

Figure 4:
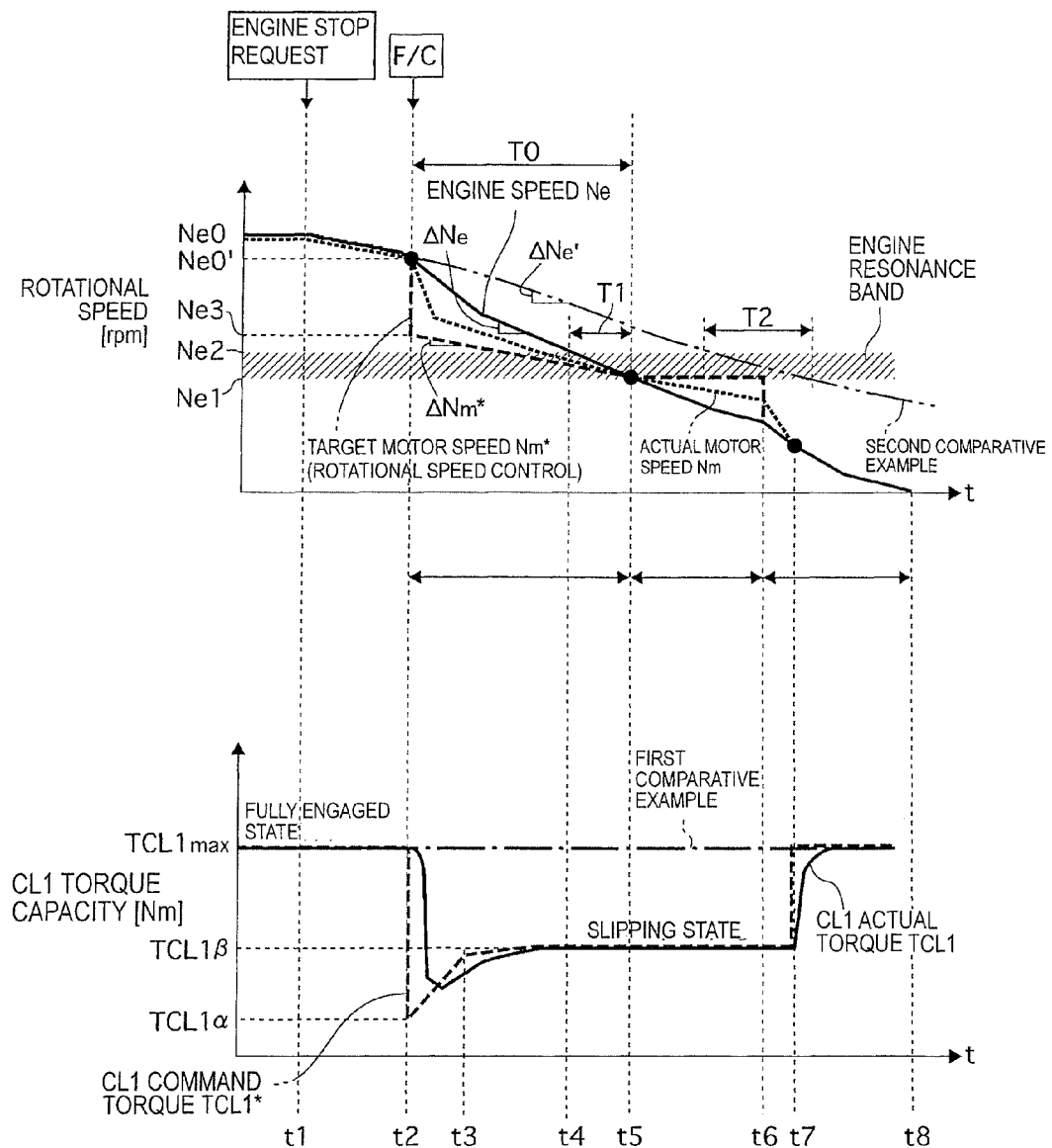
FIG. 4 is a time chart for a situation in which an engine stop control is executed by the integrated controller of the hybrid vehicle control apparatus of the illustrated embodiment.

FIG. 4 is a time chart showing how the engine rotational speed Ne, the motor rotational speed Nm, and the first clutch torque transfer capacity TCL1 change with time when an engine stop control according to the first embodiment is executed.

It is assumed that before a time t1, the vehicle is stopped in a non-driving range (Park range), the engine E is idling, and the first clutch CL1 is in a fully engaged state. The engine rotational speed Ne and the motor rotational speed Nm are both equal to an engine idle rotational speed Ne0 (i.e., Ne=Nm=Ne0). The engine idle rotational speed Ne0 is a rotational speed that is higher than both the resonance band of the power train including the engine E and the motor M and the resonance band of the engine E (including the engine mounting structure) alone. Also before the time t1, the following relationship also holds: TCL1=TCL1*=TCL1max.

At the time t1, a driver turns an ignition switch "off", thereby issuing an engine stop request. At a time t2, the fuel cut F/C control is executed. Immediately afterward, the target first clutch torque transfer capacity TCL1* is dropped from TCL1max to the value TCL1α, and the target motor rotational speed Nm* is dropped from the current engine rotational speed Ne (=Ne0') to the value Ne3.

During the period from the time t2 to a time t3, the target first clutch torque transfer capacity TCL1* is raised from the prescribed value TCL1α to the prescribed value TCL1β. Thereafter, the target first clutch torque transfer capacity TCL1* is held at the prescribed value TCL1β until a time t7. The first clutch torque transfer capacity TCL1 (actual value) changes as it follows the target first clutch torque transfer capacity TCL1*. The first motor control is executed from the time t2 to a time t5 and, during the time period T0, the target motor rotational speed Nm* is decrease gradually from the rotational speed Ne3 to the rotational speed Ne1 at a decrease rate ΔNm*. The motor rotational speed Nm (actual value) changes as it follows the target motor rotational speed Nm*.

The first motor control controls the motor rotational speed Nm to a value lower than the engine rotational speed Ne, and a torque acting in a direction of decreasing the engine rotational speed Ne and having a magnitude equal to TCL1 develops in the first clutch CL1. Consequently, during the period from the time t2 to the time t5, the engine rotational speed Ne decreases from the rotational speed Ne0' to the lower limit value Ne1 at the decrease rate ΔNe. The engine rotational speed Ne decreases to the upper limit rotational speed Ne2 of the resonance band (range from the upper limit rotational speed Ne2 to the lower limit rotational speed Ne1) of the engine mounting structure at a time t4, passes through the resonance band, and reaches the lower limit rotational speed Ne1 at a time t5.

At the time t5, the values of the rotational speeds Ne, Nm* and Nm are all equal to Ne1. After the time t5, the engine rotational speed Ne falls below the lower limit rotational speed Ne1 and the second motor control is commenced by setting the target motor rotational speed Nm* to the lower limit rotational speed Ne1. The second motor control controls the motor rotational speed Nm to a value higher than the engine rotational speed Ne, and a torque acting in a direction of increasing the engine rotational speed Ne and having a magnitude equal to TCL1 develops in the first clutch CL1. Consequently, after the time t5, the engine rotational speed Ne decreases at a rate that is slower than ΔNe.

At a time t6, the size of the rate of decrease of the engine rotational speed Ne falls below a prescribed value such that it is sufficiently slow to set the target motor rotational speed Nm* to the value of the engine rotational speed Ne and execute the third motor control. The third motor control serves to control the motor rotational speed Nm such that the motor rotational speed Nm gradually approaches the engine rotational speed Ne and becomes substantially equal to the engine rotational speed Nm.

At a time t7, the motor rotational speed Nm becomes substantially equal to the engine rotational speed Ne. As a result, the target first clutch torque transfer capacity TCL1* is raised immediately from the prescribed value TCL1β to the first clutch torque transfer capacity maximum value TCL1max and thereafter held at the first clutch torque transfer capacity maximum value TCL1max. The first clutch torque transfer capacity TCL1 (actual value) changes as it follows the target first clutch torque transfer capacity TCL1*.

At a time t8, the engine rotational speed Ne and the motor speed Nm both reach zero, the third motor control is ended, and the stop control of the engine E and the motor M is finished.

The operational effects of the illustrated embodiment will now be explained in contrast to first and second comparative examples shown in FIG. 2. In the first comparative example, the engine E is stopped while the first clutch CL1 remains fully engaged (i.e., with no difference between the engine rotational speed Ne and the motor rotational speed Nm). In the lower portion of FIG. 4, the target first clutch torque transfer capacity TCL1 of the first comparative example is indicated with a single-dot chain line. In the second comparative example, the engine E is allowed to stop naturally with the first clutch CL1 in a fully released state. In the upper portion of FIG. 4, the engine rotational speed Ne of the second comparative example is indicated with a double-dot chain line. The first embodiment differs from the first and second comparative examples in that the first clutch CL1 is controlled to a slipping state when the engine E is stopped.

When a condition for shifting to the EV mode is satisfied, the first clutch CL1 is normally fully released before stopping the engine E. However, an example of a situation in which it is acceptable to stop the engine E without releasing the first clutch CL1 is, as described above, when the accelerator pedal is released and the ignition switch is turned off while the transmission AT is in a non-driving range. The reason it is not particularly a problem to stop the engine E without releasing the first clutch CL1 is that, in the P (Park) range, the output shaft of the automatic transmission AT is fixed and the output side of the automatic transmission (drive wheel side) is not affected by fluctuations in the torque or rotational speed of the power sources (engine E and motor M). Meanwhile, in the N range, the second clutch CL2 and other holding elements inside the automatic transmission AT are released and thus, similarly to the P range, it is not particularly a problem to stop the engine E without releasing the first clutch CL1.

Even if the battery SOC is sufficient, the vehicle will not necessarily start into motion in the EV mode the next time the vehicle is started into motion because it is necessary to start the engine E and warm it when the engine coolant temperature is low. Additionally, if the accelerator position AP is large, then the vehicle is started into motion in the WSC mode. These situations assume that the engine E will be started the next time the vehicle starts into motion. Also, if the first clutch CL1 is normally closed (engaged), then the first clutch CL1 returns to a fully engaged state due to a self-shutting operation of the first clutch CL1 occurring after the ignition switch is turned "off". Thus, there are situations in which the first clutch CL1 is already engaged and it is advantageous to stop the engine E while leaving the first clutch CL1 in the engaged state.

If the engine E is stopped with the first clutch CL1 fully engaged in the manner of the first comparative example, then the engine rotational speed Ne will pass through a resonance band existing near a natural frequency of the power train (which includes the engine E and motor M) as it decreases and resonance will cause chattering of gear teeth inside the automatic transmission AT and other vibrations and noise to occur. There are two feasible ways of resolving this problem. One is to change the resonance band itself and another is to increase the rate of decrease of the engine rotational speed Ne (i.e., decrease Ne more rapidly) such that it passes through the resonance band more quickly.

In the first embodiment, the first clutch CL1 is controlled to a slipping state when the engine is being stopped. Operating the first clutch CL1 in a slipping state causes the resonance band to change because the mass (inertia) of the power train is reduced from E+M to E+$\alpha$($\alpha$<<M), where E is the inertia of the engine and M is the inertia of the motor. More specifically, the resonance band shifts to a higher range of rotational speeds. The resonance band that results after the first clutch CL1 is changed to a slipping state is a resonance band of the engine E alone (engine mounting structure) instead of a resonance band of the entire power train.

If the resonance band (i.e., the lower limit thereof) is shifted to a rotational speed region that is higher than the engine rotational speed Ne (e.g., an idle speed Ne0) occurring immediately before an engine stop request is issued, then the engine rotational speed Ne will not pass through the resonance band when it decreases during the process of stopping the engine E. This is a preferable approach from the standpoint of suppressing vibrations and noise because the cause of the vibration and noise (i.e., passing through the resonance band) can be avoided.

However, the engine rotational speed Ne occurring immediately before stopping engine is not necessarily a fixed value. For example, the idle speed Ne0 varies depending on the engine coolant temperature and the operating states of auxiliary devices that are driven by the engine E. Thus, the resonance band (i.e., the lower limit thereof) resulting after the first clutch CL1 is changed to a slipping state will not necessarily be a rotational speed that is higher than the engine rotational speed Ne occurring when the process of stopping the engine E starts. After the engine stop process has started, there is the possibility that the engine rotational speed Ne will pass through a resonance band of the engine mounting structure.

However, if the first clutch CL1 is in a slipping state, then even if the engine rotational speed Ne passes through the resonance band of the engine mounting structure, fluctuations of the engine rotational speed Ne will be absorbed by the clutch slippage and transfer of the rotational speed fluctuations to the motor M and the transmission AT will be suppressed, thereby suppressing the occurrence of gear chatter inside the transmission AT.

Meanwhile, if the first clutch CL1 is completely released, then fluctuations of the engine rotational speed Ne will presumably be substantially completely prevented from being transferred to the motor M and the transmission AT through the first clutch CL1. However, if the first clutch CL1 is completely released, then the engine rotational speed will decrease only naturally (i.e., only due to friction and the like associated with the engine rotational itself) after the fuel injection is stopped and it will not be possible to increase the rate of decrease of the engine rotational speed Ne (i.e., to decrease the engine rotational speed Ne more rapidly). Moreover, if the engine rotational speed Ne remains in the resonance band if the engine mounting structure for a long time in a situation in which the first clutch CL1 is fully released and the engine rotational speed Ne passes through the resonance band of the engine mounting structure, then any vibrations or noise resulting from resonance of the engine mounting structure will continue for a long period of time, which is undesirable.

Therefore, in the first embodiment, the engine rotational speed Ne is dropped rapidly such that it passes through the resonance band as quickly as possible and vibrations can be reliably suppressed. More specifically, the first clutch CL1 is not released completely but, instead, is controlled to a slipping state such that the torque of the first clutch torque transfer capacity TCL1 acting in a direction of decreasing the engine rotational speed Ne is imparted to the engine E. In order to generate such a torque, the motor rotational speed Nm is controlled to be smaller than the engine rotational speed Ne. As a result, the engagement torque corresponding to the first clutch torque transfer capacity TCL1 of the first clutch CL1 acts in a direction of lowering the engine rotational speed Ne. The rate of decrease of the engine rotational speed Ne can be adjusted by controlling the engagement torque corresponding to the first clutch torque transfer capacity TCL1.

As shown in FIG. 4, the size of the decrease rate $\Delta$Ne in the first embodiment is larger than the decrease rate $\Delta$Ne' in the second comparative example, in which a torque acting to lower the engine rotational speed Ne is not employed (i.e., the rate of decrease is more rapid in the first embodiment than in the second comparative example). As a result, the amount of time T1 required for the engine rotational speed Ne to pass through the resonance band of the engine mounting structure in the illustrated embodiment is shorter than the amount of time T2 required for the same in the second comparative example (i.e., T1<T2).

As explained above, the slip control of the first clutch CL1 employed in the illustrated embodiment achieves the following three operational functions: (i) changing the resonance band by changing the inertia of the power train, (ii) absorbing rotational speed fluctuations of the engine E with the clutch slippage, and (iii) causing the engine rotational speed Ne to pass through the resonance bands of the power train and the engine (mounting structure) quickly by applying an appropriate clutch torque TCL1. These operational functions serve to effectively suppress vibrations and noise, e.g., gear chatter, resulting from resonance in a hybrid vehicle having an engine E, a motor M, and a first clutch CL1 serving to connect and disconnect the engine E and the motor M.

A hybrid vehicle control apparatus according to the first embodiment offers the following effects.

(1) By controlling the first clutch CL1 to a slipping state the resonance band moves such that, in some cases, the engine rotational speed Ne will not pass through the resonance band when the engine E is stopped, thereby preventing vibration and noise from occurring. Additionally, even if the engine rotational speed Ne does pass through the resonance band after the engine stop control starts, fluctuations of the engine rotational speed Ne occurring during passage through the resonance band will be absorbed by slippage of the first clutch CL1 and prevented from being transmitted to the automatic transmission AT. Thus, at the least, the occurrence of gear chatter (a rattling sound) inside the automatic transmission AT can be suppressed.

(2) By controlling the first clutch CL1 to a slipping state after the fuel supply is cut (F/C) instead of immediately after the engine stop request occurs, the revving of the engine E caused by the slip control can be suppressed and the engine stop control can executed in a stable manner while preventing the driver from experiencing a feeling that something is odd about the vehicle.

(3) By controlling the motor M such that the motor rotational speed Nm is smaller than the engine rotational speed Ne, a torque TCL1 acting in a direction of decreasing the engine rotational speed Ne is imparted to the engine E and the engine rotational speed can be decreased more rapidly. Thus, the decrease of the engine rotational speed can be accelerated (the magnitude of the decrease rate ΔNe can be increased) and the time required for the engine E to stop after an engine stop request occurs can be shortened. Also, since the engine rotational speed Ne can be made to pass through the resonance band more quickly, any vibration resulting from resonance can be prevented from continuing for a long period of time.

(4) By lowering the target motor rotational speed Nm* after lowering the torque transfer capacity TCL1, slippage can be produced in the first clutch CL1 (i.e., a rotational speed difference between the engine rotational speed Ne and the motor rotational speed Nm can be produced). In order to enable the motor rotational speed Nm to drop rapidly in response to the target motor rotational speed Nm*, the target first clutch torque transfer capacity TCL1 should initially be decreased by a large amount (see time t2 in FIG. 4). After rapidly decreasing the target value Nm* in a step-like fashion, the target motor rotational speed Nm* is gradually ramped down. As a result, the motor rotational speed Nm can be controlled to a value lower than the engine rotational speed Ne and the control scheme can be simplified (i.e., made simpler than if the target motor rotational speed Nm* were set based on the detected engine rotational speed Ne).

(5) By controlling the motor M such that the motor rotational speed Nm is higher than the engine rotational speed Ne after the engine rotational speed Ne has decreased to a rotational speed below the prescribed resonance band (lower limit rotational speed Ne1) (steps S6 and S7 of FIG. 3), a torque acting in a direction of increasing the engine rotational speed Ne is produced in the first clutch CL1 and the engine rotational speed Ne can be decreased at a slower rate than when passing through the resonance band. Thus, in addition to the effect (3) described above, the change in rotational motion energy that occurs when the engine rotational speed Ne reaches zero can be reduced and the shock occurring when the engine stops can be alleviated while also preventing the engine rotation from reversing. Additionally, but setting the target motor rotational speed Nm* to the lower limit rotational speed Ne1, the motor rotational speed Nm can be controlled to a higher value than the engine rotational speed Ne and the control scheme can be simplified (made simpler than if the target motor rotational speed Nm* were set based on the detected engine rotational speed Ne).

(6) By engaging the first clutch CL1 fully when the engine E stops, the engine E can be started quickly the next time the ignition switch us turned on or the accelerator pedal is depressed. Also, by using a difference between the motor rotation and the engine rotation as a trigger for fully engaging the first clutch CL1, shock occurring when the first clutch CL1 is fully engaged can be decreased and clutch wear can be prevented.

(7) By using a holding element (i.e., the first clutch CL1), which is a normally-closed type holding element, the effects described in (6) above can be enhanced and the control scheme of the first embodiment can be applied to a situation in which the engine is stopped due to the ignition switch being turned off while the transmission AT is in the non-driving range.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, although a dry single-plate clutch is used as the first clutch CL1 in the illustrated embodiment, it is also acceptable to use a wet and/or multi-plate clutch. Although an automatic transmission AT is used as the transmission in the illustrated embodiment, it is acceptable to use any transmission that has a plurality of gears and/or chains that can be a source of noise and does not have a torque converter or other fluid coupling. It is also acceptable if the transmission is a manual transmission. Although in the illustrated embodiment the motor M is controlled based on rotational speed by setting a target rotational speed Nm*, it is acceptable to control the torque of the motor M by setting a target torque Tm*. In addition, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle control apparatus comprising:
an engine;
an electric motor;
a holding element arranged between the engine and the electric motor to selectively connect and disconnect the engine and the electric motor to and from each other;
an automatic transmission arranged between the electric motor and a drive wheel;
a range position detecting device arranged to detect a range position of the automatic transmission selected by a driver;
an engine rotational speed detecting device arranged to detect a rotational speed of the engine;
an electric motor rotational speed control detecting device arranged to detect a rotational speed of the electric motor; and
a controller configured to execute a control operation serving to stop the engine while also executing a slip control serving to lower a torque transfer capacity of the holding element upon a determination that a request to stop the engine has occurred while the engine is operating, the holding element is engaged, and the range position detecting device detects the automatic transmission in a non-driving range, the controller being further configured to control the electric motor such that the rotational speed of the electric motor remains below the rotational speed of the engine until the rotational speed of the engine decreases to a rotational speed that is lower than a prescribed resonance band rotational speed region, and the controller being further configured to control the electric motor such that the rotational speed of the electric motor is higher than the rotational speed of the engine after the rotational speed of the engine has decreased to the rotational speed that is lower than the prescribed resonance band rotational speed region and while the engine is still rotating.

2. The hybrid vehicle control apparatus of claim 1, wherein the controller is further configured to execute the slip control of the holding element after a fuel supply to the engine has been stopped upon establishing that the determination that the request to stop the engine has occurred.

3. The hybrid vehicle control apparatus of claim 1, wherein the controller is further configured to control the electric motor such that the rotational speed of the electric motor is substantially equal to a rotational speed target value of the electric motor; and
the controller is further configured to lower a torque transfer capacity of the holding element, then rapidly lower the rotational speed target value of the electric motor at a first rate, and then gradually lower the rotational speed target value of the electric motor at a second rate that is smaller than the first rate.

4. The hybrid vehicle control apparatus of claim 1, wherein the controller is further configured to engage the holding element completely when a difference between the rotational speed of the electric motor and the rotational speed of the engine becomes equal to or smaller than a prescribed rotational speed after the rotational speed of the engine has decreased to a rotational speed below the prescribed resonance band rotational speed region.

5. The hybrid vehicle control apparatus of claim 1, wherein the holding element is a normally-closed clutch arranged to be closed by an engagement force exerted by a force producing mechanism when at least one of a control oil flow rate and a control oil pressure is zero.

6. The hybrid vehicle control apparatus of claim 1, wherein the controller is further configured to maintain the torque transfer capacity of the holding element to a prescribed value during the slip control.

7. A hybrid vehicle control method comprising:
detecting a range position of an automatic transmission selected by a driver in which the automatic transmission is coupled between an electric motor and a drive wheel;
detecting a rotational speed of the engine;
detect a rotational speed of the electric motor; and
executing a control operation serving to stop an engine that is selectively coupled to the electric motor by a holding element that selectively connects and disconnects the engine to and from the electric motor while also executing a slip control serving to lower a torque transfer capacity of the holding element upon a determination that a request to stop the engine has occurred while the engine is operating, the holding element is engaged, and the automatic transmission is detected in a non-driving range, to control the electric motor such that the rotational speed of the electric motor remains below the rotational speed of the engine until the rotational speed of the engine decreases to a rotational speed that is lower than a prescribed resonance band rotational speed region, and to control the electric motor such that the rotational seed of the electric motor is higher than the rotational seed of the engine after the rotational speed of the engine has decreased to the rotational speed that is lower than the prescribed resonance band rotational speed region and while the engine is still rotating.

8. The hybrid vehicle control apparatus of claim 6, wherein the controller is further configured to temporarily lower the torque transfer capacity of the holding element, and subsequently raise the torque transfer capacity of the holding element to the prescribed value prior to maintaining the torque transfer capacity of the holding element to the prescribed value during the slip control.

* * * * *